Patented Aug. 30, 1949

2,480,267

UNITED STATES PATENT OFFICE 2,480,267

PRODUCTION OF BICYCLOALKYL AROMATIC COMPOUNDS

Louis Schmerling, Riverside, Ill., assignor to Universal Oil Products Company, Chicago, Ill., a corporation of Delaware No Drawing. Application August 2, 1946, Serial No. 687,965

13 Claims. (Cl. 260—668)

This invention relates to a process for producing bicycloalkyl aromatic compounds and particularly bicycloalkylbenzene hydrocarbons.

An object of this invention is to form bicycloalkyl aromatic hydrocarbons.

Another object of this invention is to produce bicycloalkylbenzene compounds.

Further objects of this invention include the arylbicycloalkanes which are new hydrocarbons formed by the process.

One specific embodiment of this invention relates to a process which comprises condensing at alkylating conditions in the presence of an alkylation catalyst an alkylatable aromatic compound and a bicycloalkene.

Another embodiment of this invention relates to a process for producing bicycloalkybenzene hydrocarbons which comprises reacting an alkylatable benzene hydrocarbon and a bicycloalkene at alkylating conditions in the presence of an acid-acting alkylating catalyst.

A further embodiment of this invention relates to a process for producing a bicycloalkylbenzene hydrocarbon which comprises reacting a benzene hydrocarbon having a replaceable nuclear hydrogen atom and a bicycloalkene containing two rings, each ring containing five carbon atoms. The process is carried out at alkylating conditions in the presence of an alkylation catalyst.

Aromatic compounds usable as starting materials in my process comprise benzene, monoalkylbenzenes, other alkylbenzenes having at least one replaceable nuclear hydrogen atom as well as polynuclear aromatic hydrocarbons containing replaceable nuclear hydrogen atoms. Other aromatic compounds which are convertible into bicycloalkyl aromatic compounds by my process include halobenzenes, phenols, naphthols, anilines, etc.

Bicycloalkene hydrocarbons, and particularly bicycloalkene hydrocarbons having two rings each containing five carbon atoms, may be produced synthetically or obtained by various known means including that of Thomas Patent 2,340,908, which discloses the thermal condensation of a monoolefin with dicyclopentadiene to form a bicycloalkene. Thus dicyclopentadiene and ethylene, reacted at an elevated temperature and pressure to form bicyclo-(2,2,1)-2-heptene, while other monoolefins, such as propylenes and butylenes react with dicyclopentadiene to form alkylated bicycloheptenes Acid-acting catalysts which are suitable for promoting the process of this invention include sulfuric acid, hydrogen fluoride, phosphoric acid, boron fluoride, and the metal halides of the Friedel-Crafts type, such as aluminum chloride, aluminum bromide, ferric chloride, etc.

My process may be carried out using either batch or continuous types of treatment. The operating conditions generally depend upon the chemical activity of the reactants and the catalyst. In general, temperatures of from about $-10°$ to about $50°$ C. are used with a catalyst such as sulfuric acid, while a higher temperature of from about $75°$ to about $300°$ C. is used in the presence of a phosphoric acid catalyst such as phosphoric acid supported by a carrier or a solid precalcined composite of a siliceous carrier and a phosphoric acid, such as pyrophosphoric acid, tetraphosphoric acid, etc., may be used. When aluminum chloride is utilized as a condensation catalyst in this process, the operating temperature will generally be below about $40°$ C.

The following example is given to illustrate the process of the invention, although the data are introduced with no intention of limiting unduly the generally broad scope of the invention.

A solution of 24 g. of bicyclo-(2,2,1)-2-heptene in 40 g. of benzene was added during 0.5 hour to a well-stirred mixture of 30 g. of 96% sulfuric acid and 80 g. of benzene at $0°$ C. Stirring was continued for an additional 0.5 hour at $0°$, the catalyst layer (34 g.) was separated from the hydrocarbon layer and the latter was washed, dried, and distilled. There was obtained, besides unreacted material, 22 g. (50% of the theoretical) of 2-phenylbicyclo-(2,2,1)-heptane boiling at $102°$ C. at 3 mm. mercury pressure and having a refractive index, $n^{20}_D$, of 1.5434. The composition of the reaction product boiling at $102°$ C. at 3 mm. pressure was substantiated by analysis which showed that it contained 90.95% carbon and 9.16% hydrogen while the calculated analysis corresponding to the formula $C_{13}H_{16}$ shows 90.64% carbon, and 9.36% hydrogen.

The residue from the above distillation consisted of 9 g. of material which became semicrystalline on standing. The crystals were separated from the oil by filtration and were recrystallized from methanol. A white powder melting at 96–97° C. was obtained. This was p-di-(sec-bicyclo-(2,2,1)-heptyl) benzene.

The phenylbicycloheptanes so formed in the process are new compositions of matter.

The nature of the present invention and types of results obtained thereby are evident from the preceding specification and example, although neither section should be misconstrued to limit unduly the broad scope of the invention.

I claim as my invention:

1. A process which comprises reacting at alkylating conditions in the presence of an alkylation catalyst an alkylatable aromatic compound and a bicycloheptene.

2. A process for producing bicycloalkylbenzene hydrocarbons which comprises reacting an alkylatable benzene hydrocarbon and a bicycloheptene at alkylating conditions in the presence of an acid-acting alkylating catalyst.

3. A process for producing a bicycloalkylbenzene hydrocarbon which comprises reacting at alkylating conditions in the presence of an acid-acting alkylating catalyst a benzene hydrocarbon having a replaceable nuclear hydrogen atom and a bicycloheptene containing two five-carbon atom rings.

4. A process for producing a bicycloalkylbenzene hydrocarbon which comprises reacting a benzene hydrocarbon having a replaceable nuclear hydrogen atom and a bicycloalkene containing two five-carbon atom rings in the presence of a sulfuric acid alkylating catalyst.

5. A process for producing a bicycloalkylbenzene hydrocarbon which comprises reacting a benzene hydrocarbon having a replaceable nuclear hydrogen atom and a bicycloalkene containing two five-carbon atom rings in the presence of a phosphoric acid alkylating catalyst.

6. A process for producing a bicycloalkylbenzene hydrocarbon which comprises reacting a benzene hydrocarbon having a replaceable nuclear hydrogen atom and a bicycloalkene containing two five-carbon atom rings in the presence of a hydrogen fluoride alkylating catalyst.

7. A process for producing 2-phenylbicyclo-(2,2,1)-heptane which comprises reacting benzene and bicyclo-(2,2,1)-2-heptene in the presence of sulfuric acid at a temperature of from about $-10°$ to about $50°$ C.

8. The process of claim 4 further characterized in that said reaction is effected at a temperature of from about $-10°$ C. to about $50°$ C.

9. The process of claim 5 further characterized in that said reaction is effected at a temperature of from about $75°$ C. to about $300°$ C.

10. The process of claim 5 further characterized in that said catalyst comprises a solid precalcined composite of a siliceous carrier and a phosphoric acid.

11. A process for producing 2-phenylbicyclo-(2,2,1)-heptane which comprises reacting benzene and bicyclo-(2,2,1)-2-heptene in the presence of an alkylation catalyst.

12. A process which comprises reacting at alkylating conditions in the presence of an alkylation catalyst an alkylatable aromatic compound and a bicyclo-(2,2,1)-2-heptene.

13. A process for producing bicycloalkylbenzene hydrocarbons which comprises reacting an alkylatable benzene hydrocarbon and a bicyclo-(2,2,1)-2-heptene at alkylating conditions in the presence of an acid-acting alkylating catalyst.

LOUIS SCHMERLING.

REFERENCES CITED

The following references are of record in the file of this patent:

UNITED STATES PATENTS

| Number | Name | Date |
|---|---|---|
| 2,129,153 | Schirm | Sept. 6, 1938 |
| 2,145,369 | Osterhof | Jan. 31, 1939 |
| 2,246,762 | Schirm | June 24, 1941 |
| 2,349,232 | Joshel | May 16, 1944 |

OTHER REFERENCES

Alder et al., Berichte, vol. 71, 379–384 (1938).
Wilson et al., "Chemical Reviews", vol. 34, No. 1 (1944), pages 1–50.